(12) United States Patent
Veerapuneni et al.

(10) Patent No.: US 7,680,070 B2
(45) Date of Patent: Mar. 16, 2010

(54) TECHNIQUES TO EXPEDITE RETRANSMISSION OF ARQ BLOCKS USING TEMPORAL RELATIONSHIPS IN WIRELESS NETWORKS

(75) Inventors: Satish Kumar Veerapuneni, Hillsboro, OR (US); Mustafa Muhammad, Portland, OR (US); Duncan Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 861 days.

(21) Appl. No.: 11/495,959

(22) Filed: Jul. 28, 2006

(65) Prior Publication Data

US 2008/0025319 A1 Jan. 31, 2008

(51) Int. Cl.
*H04L 12/56* (2006.01)
*H04J 1/16* (2006.01)

(52) U.S. Cl. .................. 370/278; 370/230; 370/282; 370/329

(58) Field of Classification Search .................. 370/278, 370/282, 252, 338, 230, 329
See application file for complete search history.

(56) References Cited

U.S. PATENT DOCUMENTS

2003/0206524 A1 11/2003 Mohanty et al.

2005/0002363 A1* 1/2005 Cheng et al. ............... 370/338
2005/0041588 A1 2/2005 Kim et al.
2005/0094667 A1* 5/2005 Dahlman et al. ........... 370/473

OTHER PUBLICATIONS

International Search Report and Written Opinion for PCT Application No. PCT/US2007/006330, mailed on Aug. 20, 2007; 10 pages.
International Preliminary Report on Patentability for PCT Application No. PCT/US2007/006330, mailed on Feb. 12, 2009; 6 pages.

* cited by examiner

*Primary Examiner*—John Pezzlo
(74) *Attorney, Agent, or Firm*—James S. Finn

(57) ABSTRACT

An embodiment of the present invention provides a method, comprising retransmitting Automatic Repeat request (ARQ) blocks from a subscriber station (SS) to a base station (BS) without waiting for a timer to expire or depending on an explicit NACK from the BS. An embodiment of the present invention may further comprise accomplishing the retransmission of ARQ blocks by performing ARQ acknowledgement state updates at the SS and BS that affect the other side at PHY frame boundary, keeping block transmission relationship to a PHY frame number at the SS, and positively deducing the outcome of a transmission at the sender by exploiting the temporal relationship between blocks transmitted in the same PHY frame.

29 Claims, 3 Drawing Sheets

TECHNIQUES TO EXPEDITE RETRANSMISSION OF ARQ BLOCKS USING TEMPORAL RELATIONSHIPS IN WIRELESS NETWORKS

BACKGROUND

Wireless networks have grown increasingly in importance and have varying uses. In order to provide secure and reliable communications standards have been developed. Although the present invention is not limited to a particular standard, once such standard, the WiMAX standard, specifies an (Automatic Repeat reQuest) ARQ mechanism to provide reliable communication over a wireless link between a Base Station (BS) and Subscriber Station (SS). The WiMax standard may also referred to as the 802.16 standard and is published by the institute for electronic and electrical engineers (IEEE).

In this mechanism, transmission occurs in units of blocks, where a block contains certain number of information bits. When a block is lost, it is retransmitted by the sender. As per the WiMAX standard specification, such retransmissions are triggered at the sending side by the expiration of a retransmission timer associated with the block when the acknowledgement (ACK) for the block is not received or when an explicit Non-acknowledgement (NACK) is received from the receiver. However, this technique may cause delays in transmissions and therefore make the wireless network less reliable.

Thus, a strong need exists for techniques to expedite retransmission of ARQ blocks using temporal relationships in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
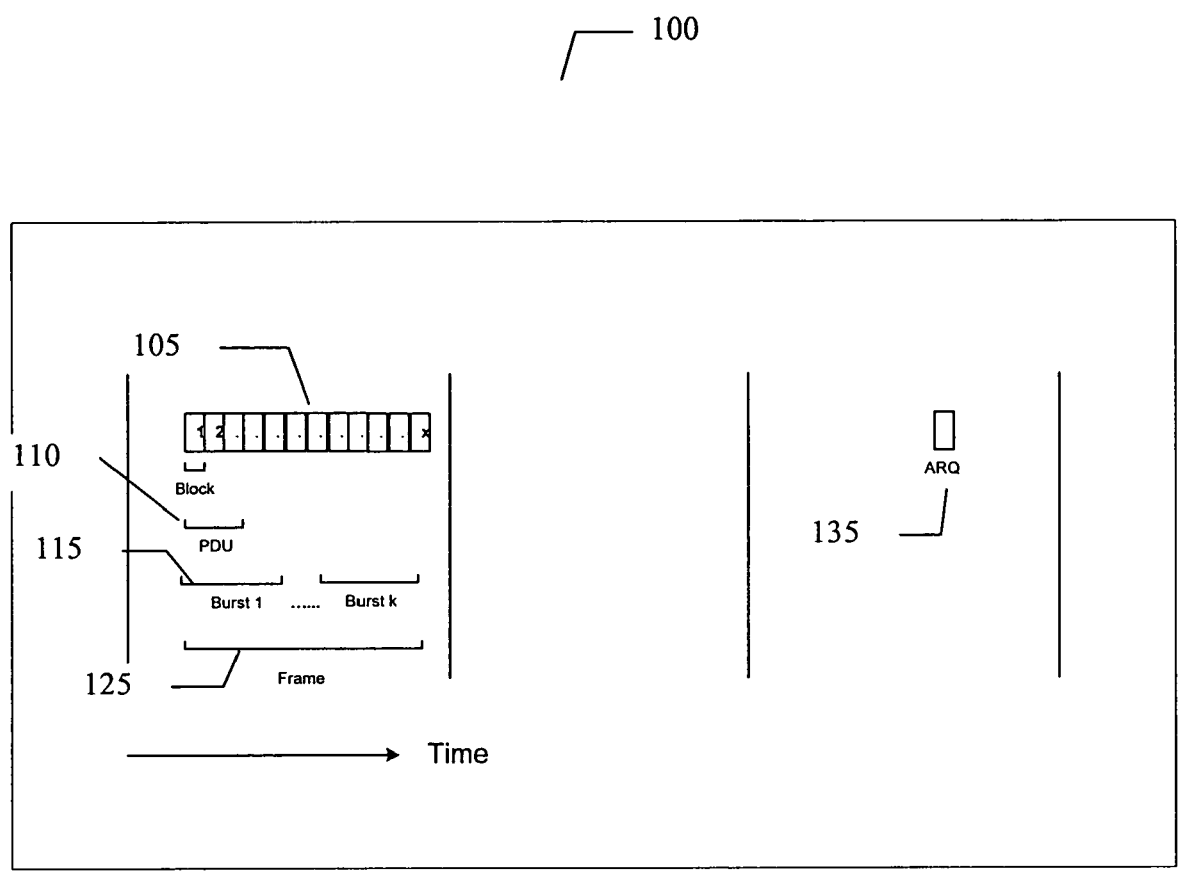
FIG. 1 is an illustration of how additional Information may be deduced about transmitted blocks of one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

An algorithm, technique or process is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software. as in a cause and effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like), wireless wide are networks (WWAN), wireless metropolitan area networks (WMAN) and Mesh networks.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause and effect relationship).

An embodiment of the present invention provides an apparatus and method for fast re-transmission of ARQ (Automatic Repeat reQuest) blocks of a connection to improve latency and throughput performance through a wireless communication network such as a WiMAX network. It is understood that the present invention is not limited to any particular type of wireless network or any particular wireless communication standard.

The WiMAX standard specifies an ARQ mechanism to provide reliable communication over the wireless link between a Base Station (BS) and Subscriber Station (SS). In this mechanism, transmission occurs in units of blocks, where a block contains certain number of information bits. When a block is lost, it is retransmitted by the sender. As per the WiMAX standard specification, such retransmissions are triggered at the sending side by the expiration of a retransmission timer associated with the block when the acknowledgement (ACK) for the block is not received or when an explicit Non-acknowledgement (NACK) is received from the receiver.

An embodiment of the present invention provides a novel method to expedite retransmission of ARQ blocks without actually waiting for the timer to expire or depending on an explicit NACK from the receiver. This may be accomplished by
1) Performing ARQ acknowledgement state updates at the sender and receiver that affect the other side at PHY frame boundary;
2) Keeping block transmission relationship to a PHY frame number at the sender;
3) Positively deducing the outcome of a transmission at the sender by exploiting the temporal relationship between blocks transmitted in the same PHY frame.

Block acknowledgment processing at the sender and receiver may be performed on a frame boundary for each connection. At the receiver, an ARQ acknowledgment for a connection may be generated after processing all the blocks received on the PHY frame. At the sender, all ARQ acknowledgements for a connection may be processed before making a retransmission decision. If an ACK for a block is received, the sender may positively deduce the outcome of a block transmission by the fact that if any block transmitted in frame N is acknowledged, then all blocks in frame N must also be acknowledged. With this theory, the sender can determine that those blocks of a connection transmitted in frame N that has not yet been acknowledged must be retransmitted immediately.

Turning now to FIG. 1 is an illustration of how additional Information may be deduced about transmitted blocks of one embodiment of the present invention. As shown generally as 100, transmissions in WiMAX when ARQ is enabled are divided into blocks 105. One or more of these blocks may be packed into a PDU 110 and one or more PDUs may be packed into a single transmission burst 115. One or more of these bursts are then packed to form a transmit frame 125.

When the ARQ message 135 arrives, there exists a race condition in that the transmitter does not necessarily know whether the receiver has processed any particular transmission or not, and hence cannot necessarily deduce whether the absence of acknowledgment for a particular block means that the block was corrupted in transmission, or whether the receiver has not yet processed that transmission.

In an embodiment of the present invention, the transmitter may apply one or more of the following to deduce additional reception status beyond what is explicitly reported and which is defined as actionable by strict implementation of the standard:

a. If an acknowledgement is received for any block in a particular frame, the transmitter may deduce that the receiver has processed that frame, and hence any blocks not explicitly acknowledged, and transmitted in that frame, may be determined to have failed and may be retransmitted immediately;
b. If an acknowledgement is received for any block in a particular PDU, the transmitter may deduce that the reception status of all the blocks in that PDU is the same as that block for which it has explicit information.

Figure 2:
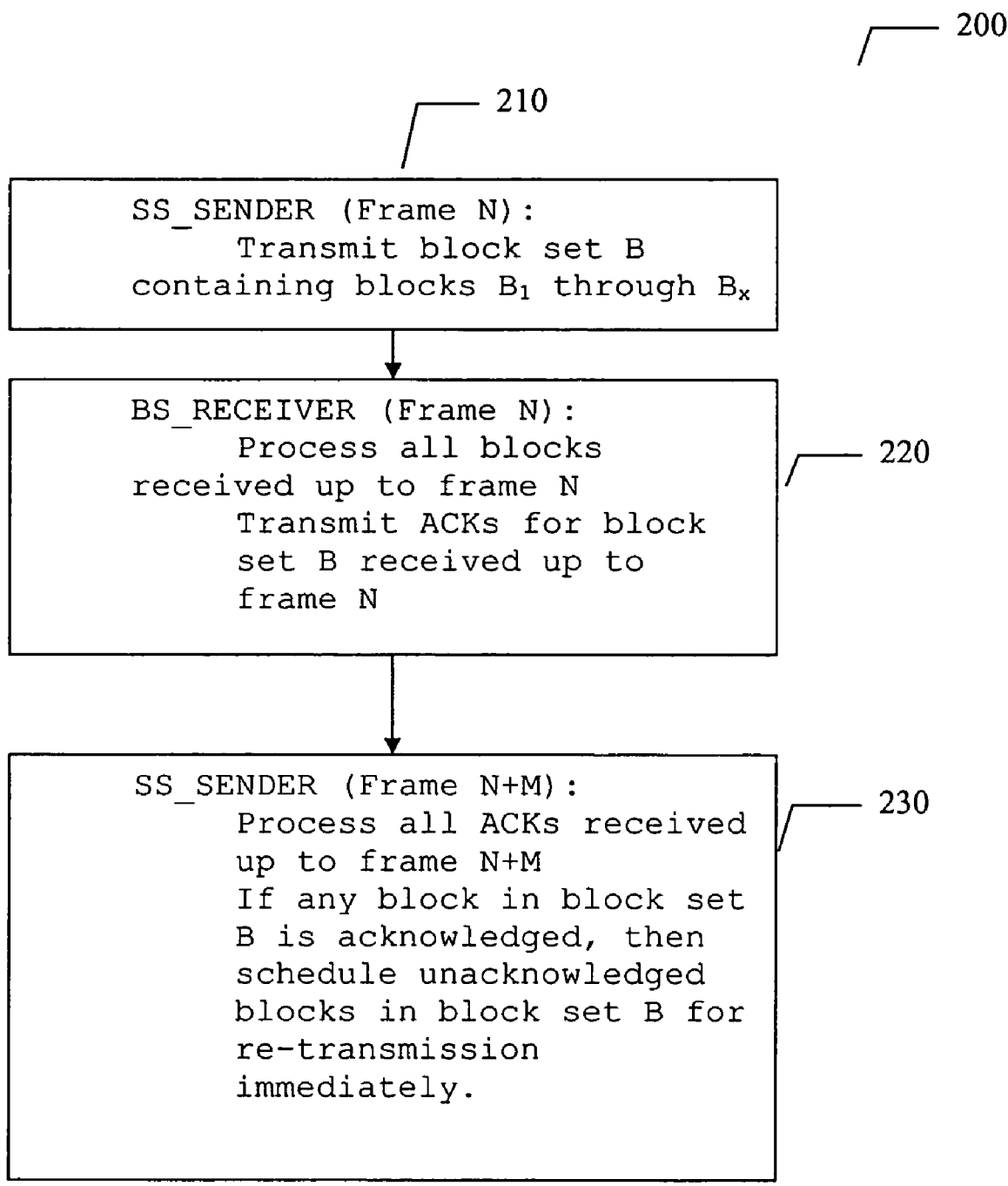
FIG. 2 illustrates a flowchart of the method according to one embodiment of the present invention.

Turning now to FIG. 2, generally at 200, is provided pseudo code that illustrates one embodiment of the present invention as applied to a Subscriber Station. This may also be applied for a Base Station by changing the parameter value for M.

Pseudo Code:

```
210:   SS_SENDER (Frame N):
           Transmit block set B containing blocks B1 through Bx
220:   BS_RECEIVER (Frame N):
           Process all blocks received up to frame N
           Transmit ACKs for block set B received up to frame N
230:   SS_SENDER (Frame N+M):
           Process all ACKs received up to frame N+M
```

If any block in block set B is acknowledged, then schedule unacknowledged blocks in block set B for re-transmission immediately.

Figure 3:
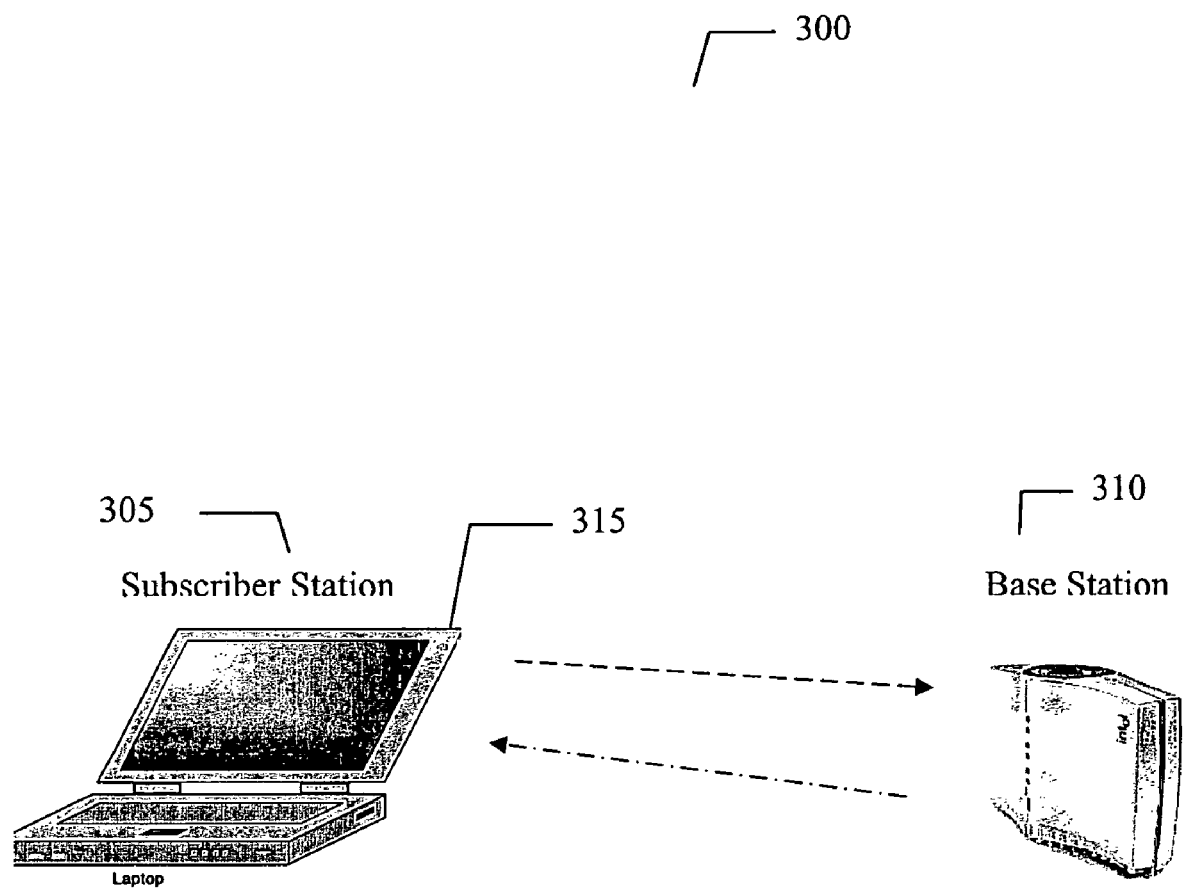
FIG. 3 illustrates the system according to one embodiment of the present invention.

FIG. 3, generally at 300, illustrates another embodiment of the present which provides a system, comprising a base station (BS) 310 operable in a wireless network, a dipole antenna 315 connected to said BS 310 and a subscriber (SS) 305 capable of communicating with said BS 310, wherein said SS 305 is further capable of expediting retransmission of Automatic Repeat request (ARQ) blocks to said BS 310 without waiting for a timer to expire or depending on an explicit NACK from said base station 310.

Still another embodiment of the present invention provides a machine-accessible medium that provides instructions, which when accessed, cause a machine to perform operations comprising retransmitting Automatic Repeat request (ARQ) blocks from a subscriber station (SS) 305 to a base station (BS) 310 without waiting for a timer to expire or depending on an explicit NACK from said BS.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. An apparatus, comprising:
   a subscriber station (SS) capable of communicating with a base station (BS) in a wireless network, wherein said subscriber station is capable of expediting retransmission of Automatic Repeat request (ARQ) blocks without waiting for a timer to expire or depending on an explicit NACK from said base station and
   wherein said expediting retransmission of ARQ blocks is accomplished by performing ARQ acknowledgement state updates at the SS and BS that affect the other side at PHY frame boundary, keeping block transmission relationship to a PHY frame number at the SS, and positively deducing the outcome of a transmission at the sender by exploiting the temporal relationship between blocks transmitted in the same PHY frame.

2. The apparatus of claim 1, wherein Block acknowledgment processing at the SS and BS are performed on a frame boundary for each connection.

3. The apparatus of claim 1, wherein at said BS an ARQ acknowledgment for a connection is generated after processing all blocks received on a PHY frame.

4. The apparatus of claim 1, wherein at said SS, all ARQ acknowledgements for a connection are processed before making retransmission decision.

5. The apparatus of claim 1, wherein said wireless network is a WiMax wireless network.

6. The apparatus of claim 1, wherein said SS is capable of deducing additional reception status beyond what is explicitly reported by determining if an acknowledgement is received for any block in a particular frame, and thereby deducing that the receiver has processed that frame, and hence any blocks not explicitly acknowledged, and transmitted in that frame, may be determined to have failed and may be retransmitted immediately.

7. The apparatus of claim 1, wherein said SS is capable of deducing additional reception status beyond what is explicitly reported by determining if an acknowledgement is received for any block in a particular PDU, thereby deducing that the reception status of all the blocks in that PDU are the same as that block for which it has explicit information.

8. A method, comprising:
retransmitting Automatic Repeat request (ARQ) blocks from a subscriber station (SS) to a base station (BS) without waiting for a timer to expire or depending on an explicit NACK from said BS; and
accomplishing said retransmission of ARQ blocks by performing ARQ acknowledgement state updates at the SS and BS that affect the other side at PHY frame boundary, keeping block transmission relationship to a PHY frame number at the SS, and positively deducing the outcome of a transmission at the sender by exploiting the temporal relationship between blocks transmitted in the same PHY frame.

9. The method of claim 8, further comprising performing Block acknowledgment processing at the SS and BS on a frame boundary for each connection.

10. The method of claim 8, further comprising generating at said BS an ARQ acknowledgment for a connection after processing all blocks received on a PHY frame.

11. The method of claim 8, further comprising processing at said SS all ARQ acknowledgements for a connection before making retransmission decision.

12. The method of claim 8, wherein said wireless network is a WiMax wireless network.

13. The method of claim 8, further comprising deducing additional reception status beyond what is explicitly reported by determining if an acknowledgement is received for any block in a particular frame, and thereby deducing that the receiver has processed that frame, and hence any blocks not explicitly acknowledged, and transmitted in that frame, may be determined to have failed and may be retransmitted immediately.

14. The method of claim 8, further comprising deducing additional reception status beyond what is explicitly reported by determining if an acknowledgement is received for any block in a particular PDU, thereby deducing that the reception status of all the blocks in that PDU are the same as that block for which it has explicit information.

15. A computer-accessible medium that provides instructions, which when accessed, cause a computer to perform operations comprising:
retransmitting Automatic Repeat request (ARQ) blocks from a subscriber station (SS) to a base station (BS) without waiting for a timer to expire or depending on an explicit NACK from said BS; and
accomplishing said retransmission of ARQ blocks by performing ARQ acknowledgement state updates at the SS and BS that affect the other side at PHY frame boundary, keeping block transmission relationship to a PHY frame number at the SS, and positively deducing the outcome of a transmission at the sender by exploiting the temporal relationship between blocks transmitted in the same PHY frame.

16. The computer-accessible medium of claim 15, further comprising said instructions causing said computer to perform operations further comprising performing Block acknowledgment processing at the SS and BS on a frame boundary for each connection.

17. The computer-accessible medium of claim 15, further comprising said instructions causing said computer to perform operations further comprising generating at said BS an ARQ acknowledgment for a connection after processing all blocks received on a PHY frame.

18. The computer-accessible medium of claim 15, further comprising said instructions causing said computer to perform operations further comprising processing at said SS all ARQ acknowledgements for a connection before making retransmission decision.

19. The computer-accessible medium of claim 15, wherein said wireless network is a WiMax wireless network.

20. The computer-accessible medium of claim 15, further comprising said instructions causing said computer to perform operations further comprising deducing additional reception status beyond what is explicitly reported by determining if an acknowledgement is received for any block in a particular frame, and thereby deducing that the receiver has processed that frame, and hence any blocks not explicitly acknowledged, and transmitted in that frame, may be determined to have failed and may be retransmitted immediately.

21. The computer-accessible medium of claim 15, further comprising said instructions causing said computer to perform operations further comprising deducing additional reception status beyond what is explicitly reported by determining if an acknowledgement is received for any block in a particular PDU, thereby deducing that the reception status of all the blocks in that PDU are the same as that block for which it has explicit information.

22. A system, comprising:
a base station (BS) operable in a wireless network; and
a subscriber (SS) capable of communicating with said BS,
wherein said SS is further capable of expediting retransmission of Automatic Repeat request (ARQ) blocks to said BS without waiting for a timer to expire or depending on an explicit NACK from said base station; and
wherein said expediting retransmission of ARQ blocks is accomplished by performing ARQ acknowledgement state updates at the SS and BS that affect the other side at PHY frame boundary, keeping block transmission relationship to a PHY frame number at the SS, and positively deducing the outcome of a transmission at the sender by exploiting the temporal relationship between blocks transmitted in the same PHY frame.

23. The system of claim 22, wherein Block acknowledgment processing at the SS and BS are performed on a frame boundary for each connection.

24. The system of claim 22, wherein at said BS an ARQ acknowledgment for a connection is generated after processing all blocks received on a PHY frame.

25. The system of claim 22, wherein at said SS, all ARQ acknowledgements for a connection are processed before making retransmission decision.

26. The system of claim 22, wherein said wireless network is a WiMax wireless network.

27. The system of claim 22, wherein said SS is capable of deducing additional reception status beyond what is explicitly reported by determining if an acknowledgement is received for any block in a particular frame, and thereby deducing that the receiver has processed that frame, and hence any blocks not explicitly acknowledged, and transmitted in that frame, may be determined to have failed and may be retransmitted immediately.

28. The system of claim 22, wherein said SS is capable of deducing additional reception status beyond what is explicitly reported by determining if an acknowledgement is received for any block in a particular PDU, thereby deducing that the reception status of all the blocks in that PDU are the same as that block for which it has explicit information.

29. A system, comprising:
a base station (BS) operable in a wireless network;
a dipole antenna connected to said BS; and
a subscriber (SS) capable of communicating with said BS, wherein said SS is further capable of expediting retransmission of Automatic Repeat request (ARQ) blocks to said BS without waiting for a timer to expire or depending on an explicit NACK from said base station; and
wherein said expediting retransmission of ARQ blocks is accomplished by performing ARQ acknowledgement state updates at the SS and BS that affect the other side at PHY frame boundary, keeping block transmission relationship to a PHY frame number at the SS, and positively deducing the outcome of a transmission at the sender by exploiting the temporal relationship between blocks transmitted in the same PHY frame.

* * * * *